J. THOMPSON.
Churn.
No. 50,645. Patented Oct. 24, 1865.
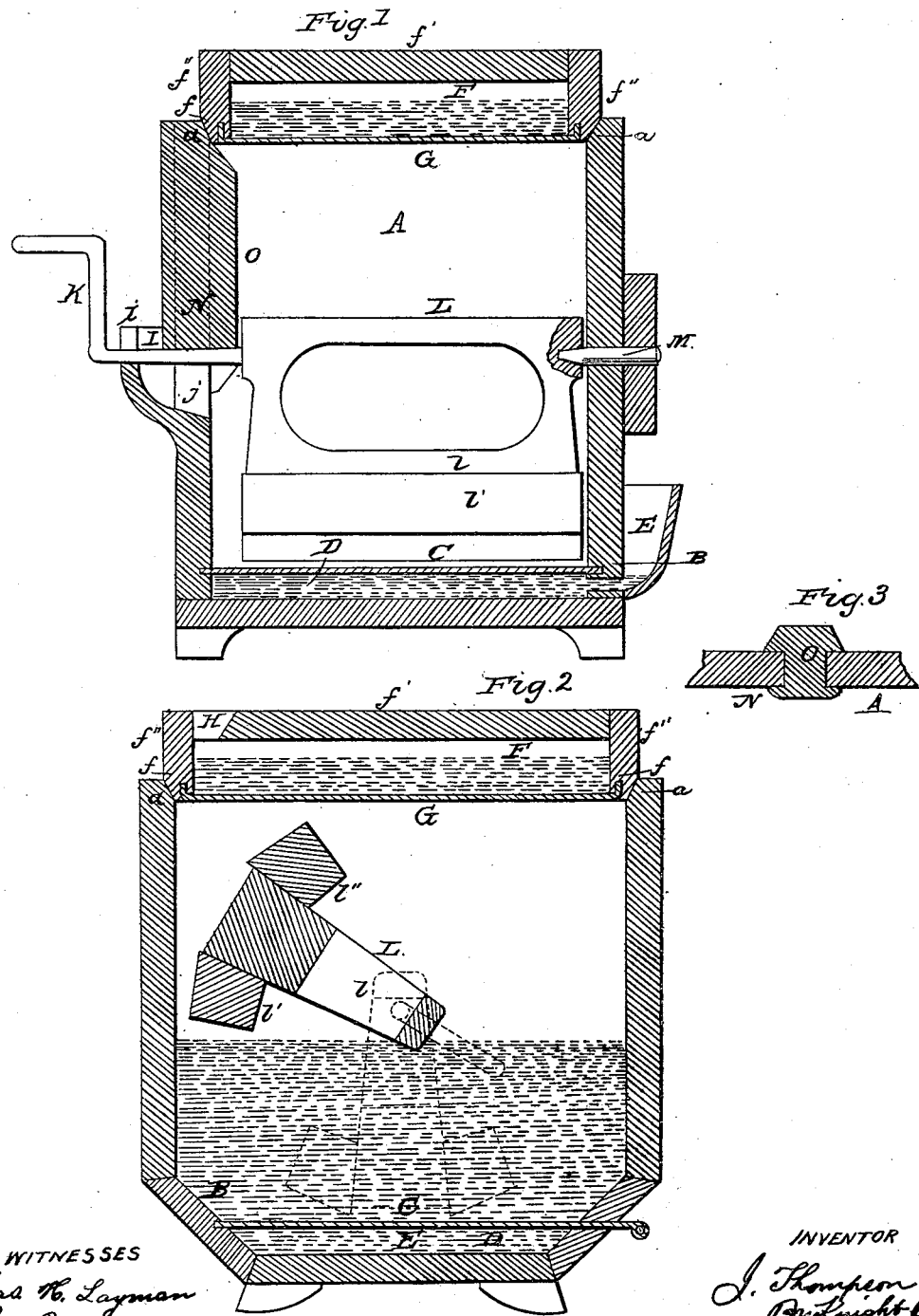

UNITED STATES PATENT OFFICE.

JAMES THOMPSON, OF VEVAY, INDIANA.

IMPROVEMENT IN CHURNS.

Specification forming part of Letters Patent No. 50,645, dated October 24, 1865.

*To all whom it may concern:*

Be it known that I, JAMES THOMPSON, of Vevay, Switzerland county, Indiana, have invented a new and useful Improvement in Churns; and I do hereby declare the following to be a full, clear, and exact description thereof, reference being had to the accompanying drawings, making part of this specification.

Figure 1 is a longitudinal section through a churn embodying my improvements. Fig. 2 is a transverse section through the same. Fig. 3 is a horizontal section through my shaft-key.

My box or receptacle A is pierced with a horizontal slit or kerf, B, a short distance above the bottom to receive a false bottom, C, of tin or zinc, forming a chamber, D, into which hot or cold water is poured by way of the gate or funnel E. The false bottom C fits the kerf B tightly enough to prevent the leakage of milk into the chamber D, or out through the sides of the box, but so as to be readily withdrawn for cleansing of the churn.

The lid or cover F is chamfered($f$) around its margin to fit and bind snugly within the chamfered rim $a$ of the box, so as to form a milk-tight joint, and yet to enable the ready removal of the said cover.

The top $f'$ and sides $f''$ of the cover consists of a wooden box closed at bottom by a sheet of tin or zinc, G, whose upset edge enters a kerf in the lower edges of the sides $f''$. H is an aperture for the insertion of hot or cold water.

I is a pouch projecting from one end of the box, with which it communicates by means of a dripway, J.

$i$ is a notch in the brim of the pouch I, forming a bearing for the crank K of my dasher L, whose inner end is centered upon a stud, M, which projects inwardly from the box.

N is a notch in the end of the box to receive a key, O, wherewith the crank is held in its bearing and the box closed.

The dasher L consists of a blade, $l$, perforated or solid, and wings $l'$ $l''$.

The effect of the above-described dasher in revolving is for its flank or side to violently strike the surface of the milk and for its notched or grooved periphery to produce an active friction between the dasher and the sides and bottom and top of the box.

I claim herein as new and of my invention.

1. The dasher L $l$ $l'$ $l''$, formed and operating as set forth.

2. The arrangement of pouch I $i$ and dripway J.

3. The pouch I $i$ and dripway J, when combined with the notch N and key O.

In testimony of which invention I hereunto set my hand.

JAMES THOMPSON.

Witnesses:
 GEO. H. KNIGHT,
 JAMES H. LAYMAN.